May 12, 1959     J. G. PERLMUTTER     2,886,388
CORNER PLATE
Filed Nov. 25, 1957
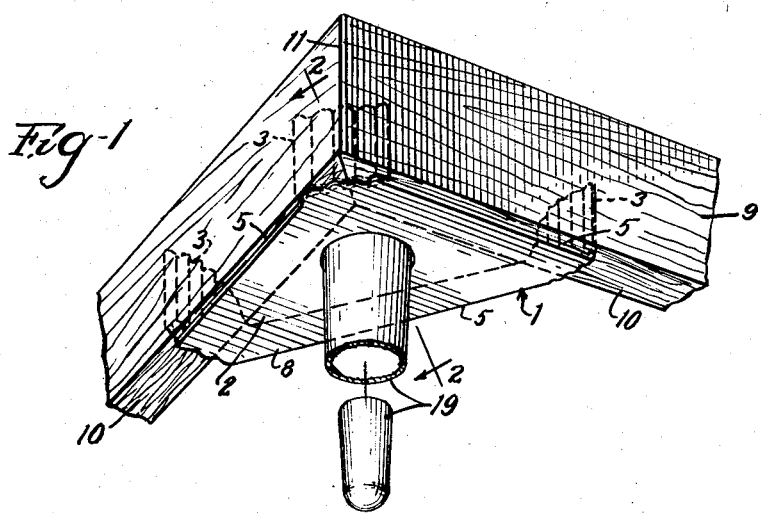
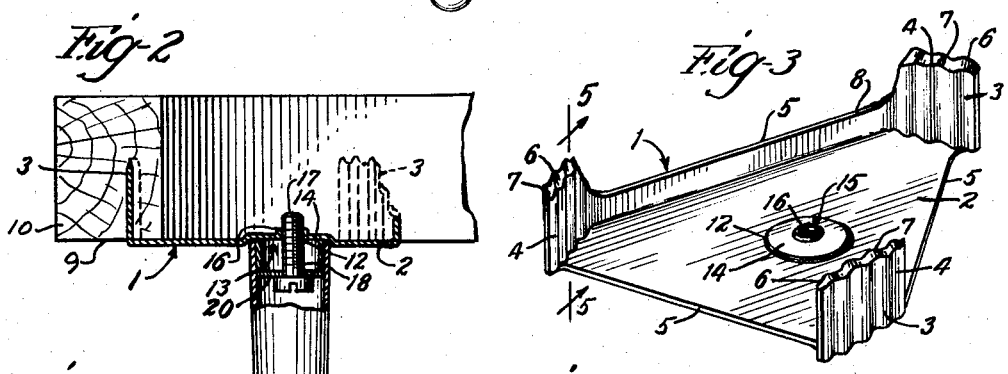
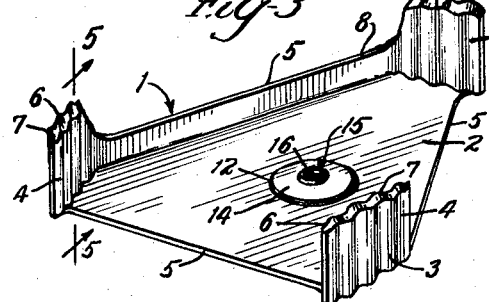
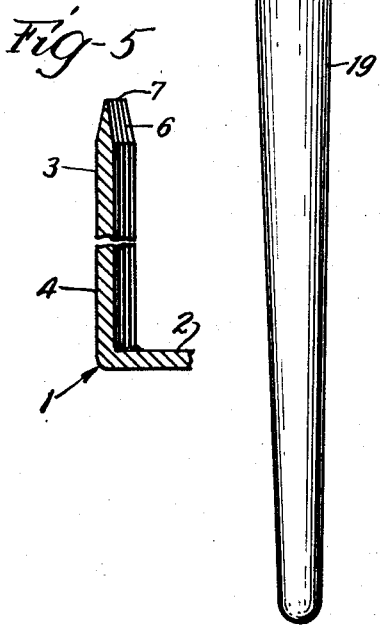
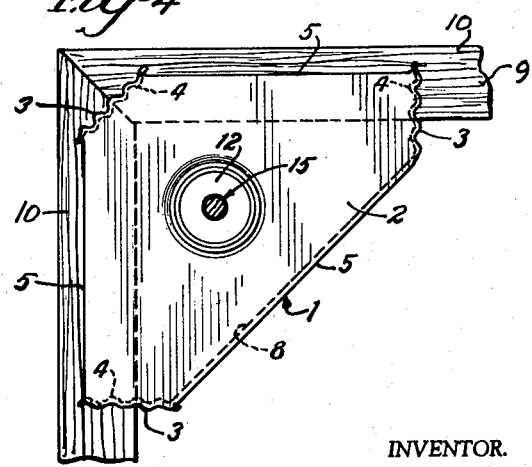
INVENTOR.
JOSEPH GORDON PERLMUTTER,
BY Marzall, Johnston, Cook & Root.
ATT'YS.

United States Patent Office 2,886,388
Patented May 12, 1959

2,886,388

CORNER PLATE

Joseph Gordon Perlmutter, Plainfield, N.J., assignor to Hayden Manufacturing Company, Chicago, Ill., a corporation of Illinois Application November 25, 1957, Serial No. 698,836

6 Claims. (Cl. 311—114)

This invention relates to a corner plate construction for the attachment of legs to pieces of furniture, such as tables, particularly television tables. More specifically, the invention relates to a corner plate or bracket construction adapted to be applied to a piece of furniture, such as a television table, to which a table leg is secured.

The invention comprises a corner plate or bracket in the form of a right angle triangle, the plate being flat, and having integrally secured thereto at its three corners, upstanding corrugated fasteners or fastening members so that the fasteners may be driven into the wood of a table at the corners of the table without the use of nails, screws, or any other additional securing means. The plate is provided with an embossment forming a recess or depression on its underside into which the upper end of a leg is received, there being screw means, such as an inverted bolt, secured to the leg, and screwed directly into the threads surrounding an opening arranged concentric with the depression or embossment.

The primary object of the present invention is the provision of a rigidly constructed corner plate having new and improved attaching means for securement to a table at the corners thereof without the use of any securing means other than that formed integrally with the corner plate.

Another important object of the invention consists in the provision of an integral flat plate, preferably in the form of a right angle triangle, the three corners of the triangular plate having upstanding ledges or projections bent therefrom, the ledges being corrugated transversely and with sharpened outer ends to form integral corrugated fasteners, the plate being applied to a table merely by pounding the sharpened fasteners into the structural framework of a table.

A further object of the invention consists in the formation of a triangular-shaped corner plate or bracket, there being integral upstanding ledges or projections formed on the upper face of the plate, the projections being corrugated and sharpened at their outer ends so that the plate may be attached to a table without any additional securement means, a pair of adjacent projections being connected by an integral flange to render stiffness and to add rigidity to the plate.

Numerous other objects and advantages will be apparent throughout the progress of the specification which follows.

The accompanying drawings illustrate a certain selected embodiment of the invention, and the views therein are as follows:

Fig. 1 is a detail perspective view of a corner of a table at the underside thereof and having the invention applied thereto;

Fig. 2 is a detail vertical sectional view on the line 2—2 of Fig. 1;

Fig. 3 is a detail perspective view of the improved plate embodying the invention;

Fig. 4 is a detail bottom plan view of a table and having the invention applied thereto; and Fig. 5 is a detail vertical sectional view on the line 5—5 of Fig. 3.

The particular construction herein shown for the purpose of illustrating the invention comprises a corner plate 1 comprising a flat body 2 from which projections 3 are bent. The plate 2 and the projections 3 are preferably stamped or punched from a single sheet of metal, the projections being bent upwardly to provide corner fasteners 4. Each corner fastener 4 is disposed at an angle of substantially forty-five degrees from the bounding side edges 5 of the plate 2 which is in the form of a right angle triangle. Each projection or fastener 4 is corrugated transversely to provide transverse alternate ridges and furrows which extend vertically along each fastener or projection 3, as clearly shown in Fig. 3.

The ridges on one side of a fastener 4, which are formed by the furrows or hollows on the other or opposite side, are bevelled as indicated at 6, Fig. 3 and in effect form teeth which are divergent. Every vertical corrugation on one side is bevelled inwardly, while the corrugation on the other side is bevelled inwardly in the manner in which corrugated fasteners are formed. The beveling of the corrugations on opposite sides form sharp points 7 at the extreme ends of the corrugations.

Two of the projections 3 are integrally connected by an upstanding flange 8 which is integral with the plate 2 and with a pair of projections 3, the flange being located preferably at the longest dimension or hypotenuse of the right angle, triangularly-shaped plate.

The corner plate, when arranged at a corner of the table, 9, will be located inwardly of the corner of the table, as shown in Figs. 1 and 4. The corner plate 1 is adapted to be located at each corner of the table 9, and is held in place by driving the fasteners 4 into the rails 10 of the table top at the underside thereof, there being one fastener 4 cooperating with each rail 10, and the remaining fastener preferably engaging both of the rails 10, Figs. 1 and 4, where the rails are connected together at each table corner 11.

Each plate 1 is secured to the table 9 at the corner thereof by merely driving the corrugated fasteners 4 into the wood framework, such as by pounding the plate with a hammer at the point where a fastener is located, thus driving the fasteners home into the rails 10 of the table, Figs. 1 and 4.

An embossment 12 is formed relatively centrally of the flat body 2 of the plate 1 with the hollow side, the recess 13, of the embossment at the underside of the plate. The upper projecting surface 14 of the embossment projects upwardly from the top of the flat body part 2 of the plate 1. The plate 1 is provided with an opening 15 concentrically located with respect to the embossment 12, the opening or hole 15 being made by a stamping or forming operation, leaving a relatively circular neck 16 about the opening 15. This neck 16 is internally threaded to receive the stem 17, Fig. 2, of an upstanding bolt or screw 18. The bolt or screw 18 is secured rigidly to a table leg 19, which leg is shown as being made of hollow metal and in tubular form. The screw 18 may be rigidly secured to a cup-shaped element 20 which, in turn, is fixed to the inside of the tubular leg at the upper end thereof, being soldered or welded, or otherwise secured to the leg.

The leg 19, having the screw 18 secured thereto, Fig. 2, is threaded into the neck 16, while the peripheral upper end of the leg 19 is received in the recess or depression 13 formed by the embossing or stamping operation for forming the member 12.

The invention is emphasized for application to a table, but it is adaptable for use in connection with other furniture, such as chairs.

The plate 1, therefore, may be secured readily and quickly to a piece of furniture such as a table top or chair without the use of any tools, except a hammer, while the leg 19 is applied in position by merely screwing it into the threaded opening in the body 2 of the plate 1.

The invention provides a corner plate construction for furniture and is rigid, strong, and durable; it may be readily and economically manufactured; and may be quickly and easily applied to the corners of a chair, table, and the like; and the leg is quickly and easily applied to the plate by merely screwing the leg in position with its rigid screw 18 screwed into the threaded opening 16.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A metal corner plate construction for furniture for the application of legs thereto comprising a relatively triangularly-shaped flat plate having integral projections extending upwardly on one side of the plate at the three corners thereof, said projections on said plate being corrugated transversely to provide elongated vertically extending ridges and furrows, the upper ends of each ridge of a corrugation on each side of a projection being bevelled and diverging and sharpened for easy driving of the projections into a piece of furniture at the corners thereof, and means for screwing a leg to said plate within the confines of the plate and projections.

2. A metal corner plate construction for furniture for the application of legs thereto comprising a relatively triangularly-shaped flat plate having integral projections extending upwardly on one side of the plate at the three corners thereof, said projections being corrugated transversely to provide alternate elongated vertically extending ridges and furrows, the upper ends of each ridge of a corrugation diverging inwardly and being bevelled to form sharpened edges for easy driving of the projections into a piece of furniture at the corners thereof, two of said projections being positioned along the hypotenuse of the triangular plate and angularly thereto, another projection being positioned at the remaining corner, and an integral upstanding flange integrally connected to said latter two projections.

3. A metal corner plate construction for tables to have legs secured to the plate comprising a relatively triangularly-shaped flat plate having integral projections extending upwardly on one side of the plate at the three corners thereof, said projections being corrugated transversely to provide elongated vertically extending ridges and furrows, the upper ends of each corrugated projection being sharpened for easy driving of the projections into the rails of a table at the corners thereof, the projections being at an angle of substantially forty-five degrees from the intersecting bounding sides of the triangle plate.

4. A metal corner plate construction for tables to which table legs are connected comprising a relatively triangularly-shaped flat plate having integral projections extending upwardly on one side of the plate at the three corners thereof, said projections being corrugated transversely to provide elongated vertically extending ridges and furrows, the upper ends of each corrugated projection being sharpened for easy driving of the projections into the rails of a table at the corners thereof, two of said projections being positioned along the hypotenuse of the triangular plate and located angularly thereof, an integral upstanding flange connecting the latter two projections, and another projection being located at the third corner of the plate and angularly to the sides of said plate, said plate having a central embossment forming a central recess to receive a table leg.

5. A metal corner plate construction for tables for the application of table legs to the plate comprising a relatively triangularly-shaped flat plate having integral projections extending upwardly on one side of the plate at the three corners thereof, said projections being corrugated transversely to provide elongated vertically extending ridges and furrows, the upper ends of each corrugated projection being sharpened for easy driving of the projections into the rails of a table at the corners thereof, an upstanding flange integrally connected to two of said projections along the hypotenuse of the triangular plate, another upstanding projection at the third corner of said plate, said plate having a central embossment forming a central recess to receive a table leg, said embossment having a central opening therein, and a threaded neck surrounding said opening for the attachment of a leg thereto, said projections being angularly disposed with respect to the bounding sides of the plate.

6. A metal corner plate construction for tables for applying table legs to the plate comprising a relatively triangularly-shaped flat plate having sharp integral projections extending upwardly on one side of the plate at the three corners thereof for easy driving of the projections into the rails of a table at the corners thereof, two of said projections along the hypotenuse of the triangular plate being angularly disposed with respect to said hypotenuse, said plate having a central embossment forming a central recess to receive a table leg, said embossment having a central opening therein, a threaded neck surrounding said opening, a leg in engagement with said plate, and a screw on the leg for screwing the leg into the circular threaded opening, the top of said leg being receivable into the recess.

References Cited in the file of this patent
UNITED STATES PATENTS

| | | |
|---|---|---|
| 1,472,418 | Hoffman | Oct. 30, 1923 |
| 1,539,112 | Gloekler | May 26, 1925 |
| 1,763,341 | Brantingham | June 10, 1930 |
| 1,800,148 | Mahoney et al. | Apr. 7, 1931 |
| 1,876,683 | Johnson et al. | Sept. 13, 1932 |
| 2,117,308 | Frey | May 17, 1938 |
| 2,596,181 | Soderberg et al. | May 13, 1952 |
| 2,738,246 | Hogan | Mar. 13, 1956 |
| 2,782,673 | Packard | Feb. 26, 1957 |